No. 845,925. PATENTED MAR. 5, 1907.
L. BLESSING.
SECTIONAL CEMENT RAILROAD TIE.
APPLICATION FILED JAN. 10, 1906.
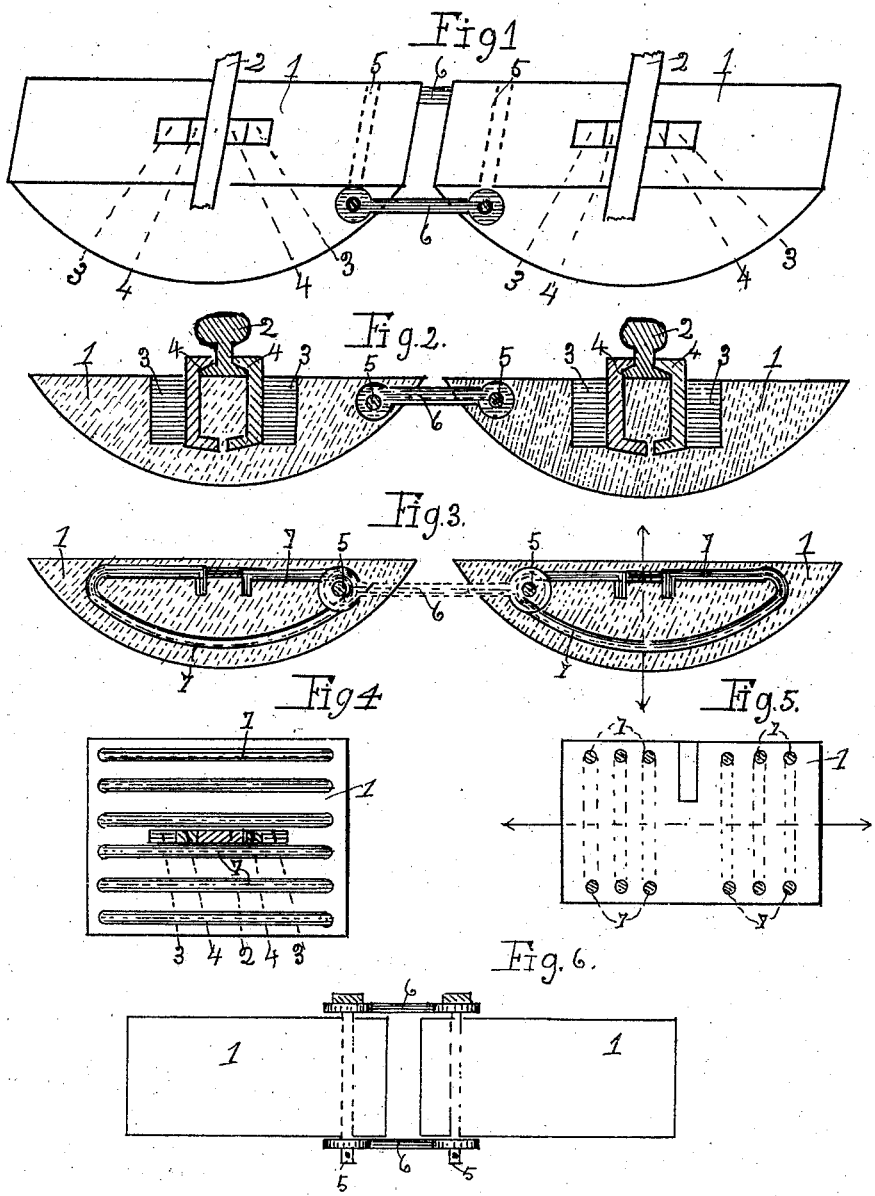

UNITED STATES PATENT OFFICE.

LOUIS BLESSING, OF JACKSON, MICHIGAN.

SECTIONAL CEMENT RAILROAD-TIE.

No. 845,925.  Specification of Letters Patent.  Patented March 5, 1907.

Application filed January 10, 1906. Serial No. 295,386.

*To all whom it may concern:*

Be it known that I, LOUIS BLESSING, a citizen of the United States, residing at the city of Jackson, in the county of Jackson and State of Michigan, have invented new and useful cement blocks coupled together with side straps suitably arranged to form a sectional sleeper or tie sufficient to carry the rails of a railroad, of which the following is a specification.

My invention relates to improvements in cement blocks coupled together by side straps and bolts passing through the blocks.

The objects of my invention, first, are to make a cement block sufficient to carry the rails and rolling-stock of a railroad passing over them; second, to produce a railroad tie or sleeper that is easy to make and durable; third, the manner of safely securing the rails to the cement blocks. I attain these objects by the mechanism illustrated in the accompanying drawings, in which—

Figure 1 is a detail view in perspective of the cement blocks, showing top and side views and how the rails are located on the cement blocks, also showing the straps and bolts securing the two cement blocks together. Fig. 2 is a vertical longitudinal section of the cement tie or sleeper, showing end of the rails and side of the clamp for fastening the rails to the cement blocks, also straps. Fig. 3 is a side longitudinal view showing how the wires are placed in the cement blocks, also the side straps and bolts coupling the cement blocks together. Fig. 4 is a top view showing the wires placed lengthwise of the cement blocks. Fig. 5 is a vertical cross-sectional view of one section of the tie or sleeper, showing the ends of the wires in the cement blocks. Fig. 6 is a top view of the sectional cement blocks, showing the side straps and bolts for coupling the two cement blocks together.

Similar figures or numerals refer to similar parts throughout the several views.

The cement blocks 1 1, on which the rails 2 2 are laid and secured, are shown in Figs. 1, 2, and 3. The sectional cement blocks 1 1 are coupled together by the straps 6 6 and bolts 5 5. One strap is placed on each side of the cement blocks 1 1. The bolts 5 5 are passed through the inner ends of the cement blocks 1 1 behind the wires 7 7. The object of the straps 6 6 and bolts 5 5 is to keep the cement blocks 1 1 from spreading apart or contracting and to allow a yielding action. In each one of these cement blocks 1 1 centrally are made two holes, one on each side of the rails 2 2. In these holes in the cement blocks 1 1 are placed the metal clamps 4 4, and the wood keys 3 3 for holding the rails 2 2 firmly in their place on the cement blocks 1 1 are plainly shown in Fig. 2. In Fig. 3 the wires 7 7 form a semicircle on the lower side of the cement blocks and straight on the top side, overlapping each other, having the ends turned down in the cement block 1 1. The bolts 5 5 are placed in the inner ends of the cement blocks 1 1 behind the inside of the wires 7 7. By this manner of construction the wires greatly add to the strength of the cement block for a tie or sleeper for a railroad.

I am aware that prior to my invention cement ties have been used in place of wood or metal. I therefore do not claim such a combination broadly; but What I do claim as my invention, and desire to secure by Letters Patent, is—

1. In a flexible cement-block tie or sleeper, of the combination with the cement blocks, of the straps placed, one on each side of the cement blocks, journaled on the bolts coupling the two cement blocks together allowing them to have yielding action as shown, and for the purpose specified.

2. In a sectional cement-block tie or sleeper, for railroad, having holes centrally in said cement blocks, the metal clamps inserted in said holes and gripping the cement block at or near the bottom, and gripping the flanges of the rails at the top, the wood keys inserted in the cement blocks in the holes behind the metal clamps as shown, and for the purpose specified.

In testimony whereof I have signed my name to this specification in the presence of two subscribing witnesses.

LOUIS BLESSING.

Witnesses:
 JOHN M. SPINNING,
 JOHN W. KNIGHT, Jr.